(12) United States Patent
Kamishita et al.

(10) Patent No.: US 7,070,274 B2
(45) Date of Patent: Jul. 4, 2006

(54) SPECTACLE LENS

(75) Inventors: Kaoru Kamishita, Nagano (JP); Kazutoshi Kato, Nagano (JP); Tadashi Kaga, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/907,313

(22) Filed: Mar. 29, 2005

(65) Prior Publication Data
US 2005/0225719 A1   Oct. 13, 2005

(30) Foreign Application Priority Data
Mar. 30, 2004   (JP) ............................. 2004-099224

(51) Int. Cl.
*G02C 7/02* (2006.01)
(52) U.S. Cl. .................. 351/159; 351/41; 351/177
(58) Field of Classification Search ............. 351/159, 351/41
See application file for complete search history.

(56) References Cited

U.S. PATENT DOCUMENTS

| | | | |
|---|---|---|---|
| 6,361,166 B1 | 3/2002 | Perrott | |
| 6,364,481 B1 | 4/2002 | O'Connor | |
| 6,755,525 B1* | 6/2004 | Reichow et al. | 351/178 |
| 6,871,954 B1* | 3/2005 | Copeland | 351/163 |
| 2001/0001570 A1* | 5/2001 | Houston et al. | 351/177 |
| 2002/0118337 A1 | 8/2002 | Perrott et al. | |
| 2002/0149739 A1 | 10/2002 | Perrott et al. | |

FOREIGN PATENT DOCUMENTS

| | | |
|---|---|---|
| EP | 0 461 624 B1 | 9/1995 |
| JP | 04-045419 | 2/1992 |
| JP | 05-323185 | 12/1993 |
| JP | 06-118352 | 4/1994 |
| JP | 2000-066148 | 3/2000 |
| JP | 2003-015095 | 1/2003 |
| WO | WO 97/21136 | 6/1997 |
| WO | WO 97/21139 | 6/1997 |
| WO | WO 99/52480 | 10/1999 |
| WO | WO 00/04414 | 1/2000 |

* cited by examiner

*Primary Examiner*—Jordan M. Schwartz
(74) *Attorney, Agent, or Firm*—Sughrue Mion, PLLC

(57) ABSTRACT

To provide a spectacle lens that is designed optically to suit a spectacle frame with a large camber angle such as a wraparound type spectacle frame. A spectacle lens that is mounted in a spectacle frame with a camber angle of 200° or more, in which cylindrical power for offsetting astigmatic aberration, which is caused by the camber angle at a design reference point, is added to a refractive surface on an object side or a refractive surface on an eye side, prismatic power for offsetting prismatic effect, which is caused by the camber angle at the design reference point, is added to the refractive surface on the object side or the refractive surface on the eye side, and aspherical surfaces different from each other on a nose side and an ear side are formed on the refractive surface on the object side or the refractive surface on the eye side.

18 Claims, 7 Drawing Sheets

F I G.3A
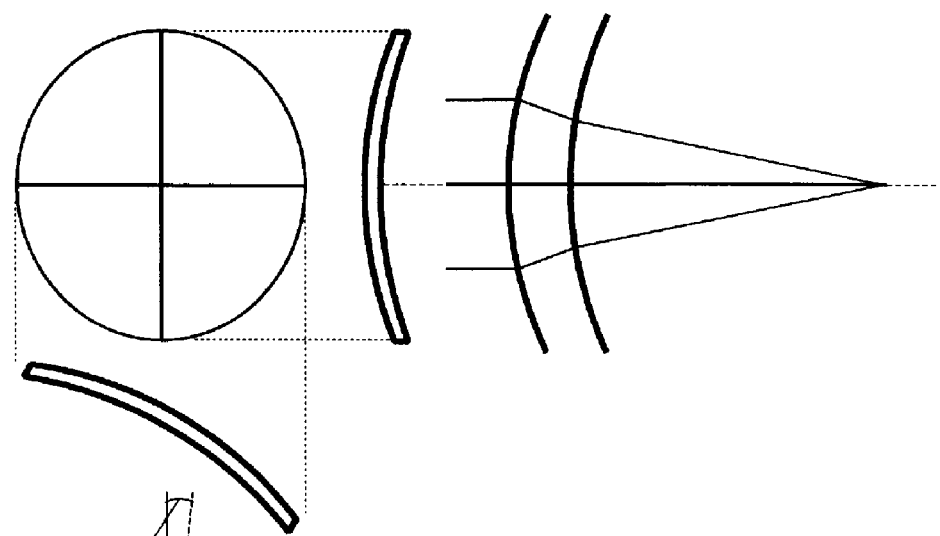
F I G.3B PRISM
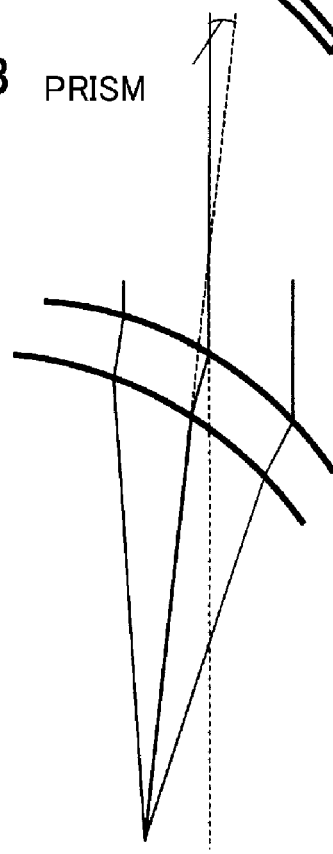

VISUAL ABERRATION

VISUAL AVERAGE DIOPTRIC POWER

CAMBER ANGLE 210°

VISUAL ABERRATION

VISUAL AVERAGE DIOPTRIC POWER

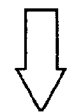 CORRECT ABERRATION AND PRISMATIC POWER AT DESIGN REFERENCE POINT 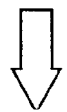
FIG.5A
VISUAL ABERRATION
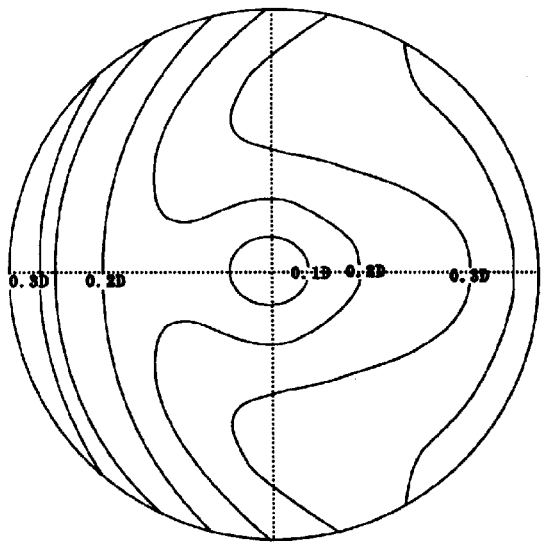
FIG.5B
VISUAL AVERAGE DIOPTRIC POWER
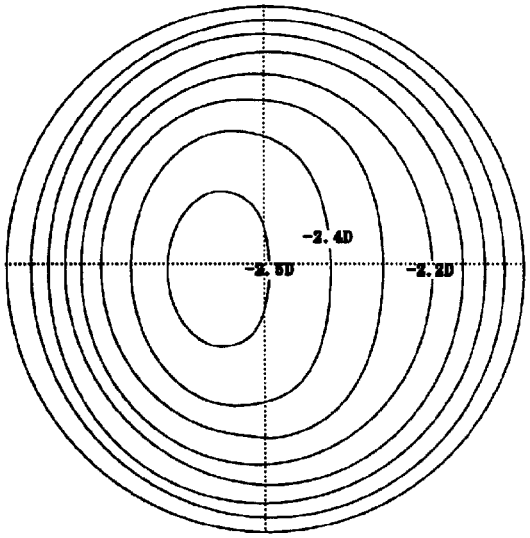
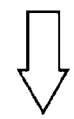 ADD ASPHERIC SURFACE REPRESENTED BY ASPHERIC EXPRESSION 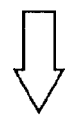
FIG.5C
VISUAL ABERRATION
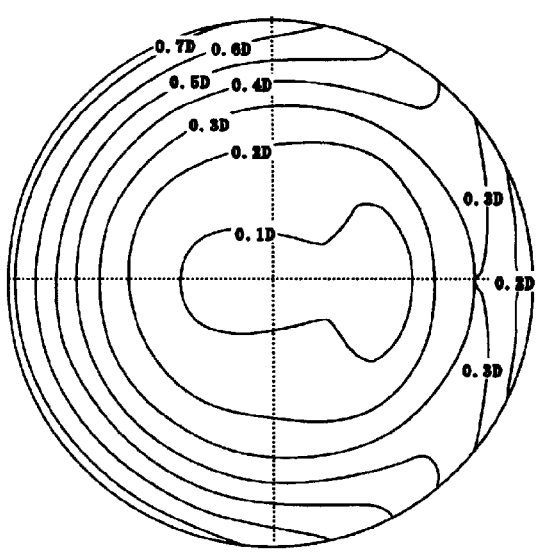
FIG.5D
VISUAL AVERAGE DIOPTRIC POWER
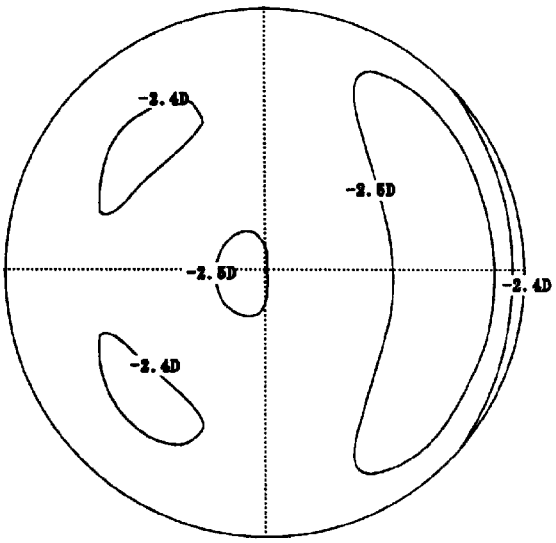

SURFACE ABERRATION OF CONCAVE SURFACE IN FIRST EMBODIMENT

SURFACE DIOPTRIC POWER OF CONCAVE SURFACE IN FIRST EMBODIMENT

SURFACE ABERRATION OF CONCAVE SURFACE IN SECOND EMBODIMENT

SURFACE DIOPTRIC POWER OF CONCAVE SURFACE IN SECOND EMBODIMENT

VISUAL ABERRATION IN CONVENTIONAL EXAMPLE

VISUAL AVERAGE DIOPTRIC POWER IN CONVENTIONAL EXAMPLE

VISUAL ABERRATION IN SECOND EMBODIMENT

VISUAL AVERAGE DIOPTRIC POWER IN SECOND EMBODIMENT of Japanese Application No. 2004-099224, filed Mar. 30, 2004, which is incorporated by reference, herein, in its entirety.

SPECTACLE LENS

This application claims the benefit of Japanese Application No. 2004-099224, filed Mar. 30, 2004, which is incorporated by reference, herein, in its entirety.

FIELD OF THE INVENTION

The present invention relates to a spectacle lens that is intended for use in a spectacle frame having a large camber angle, such as a wraparound type of frame.

BACKGROUND OF THE INVENTION

In recent years, a spectacle frame of the wraparound type has become popular, especially as sports sunglasses. An oblique perspective view of such a spectacle frame is shown in FIG. 1(a), and an upper side perspective view is shown in FIG. 1(b). As shown in FIG. 1, the spectacle frame of the wraparound type has a characteristic that, since the spectacle frame of the wraparound type has a large camber angle to bend around a face, even the sides of the face are covered by lenses and the field of view is wide. Therefore, a spectacle frame of the wraparound type (also known as "wraparounds") is regularly used by athletes as a frame for safety spectacles used during sports and for general eye protection.

The number of people in general using wraparounds has been increasing due to the influence of the increased number of athletes who wear them. Therefore, there is an increasing demand for wraparounds, even from people required to wear spectacles just for vision correction.

Conventionally, however, under the present situation, only an optical lens with a large curvature, corresponding to a deep curve of the wraparound type, is provided as a spectacle lens for correction that is mounted in the spectacle frame of the wraparound type, and no spectacle lens optically corresponding to the spectacle frame of the wraparound type has yet been provided.

SUMMARY OF THE INVENTION

The invention has been devised in view of the circumstances, and it is an object of the invention, among others, to provide a spectacle lens that is designed optically to suit a spectacle frame with a large camber angle, such as the wraparound type spectacle frame.

In order to attain the above-identified and other objects of the invention, first, one embodiment of the invention provides a spectacle lens that is intended for use in, and optionally mounted in, a spectacle frame with a camber angle of 200° or more. According to this embodiment, the cylindrical power for offsetting astigmatic aberration caused by the camber angle, at a design reference point, is added to a refractive surface on an object side or a refractive surface on an eye side. Prismatic power for offsetting prismatic effect, which is caused by the camber angle, at the design reference point is added to the refractive surface on the object side or the refractive surface on the eye side. Aspherical surfaces, different from each other on a nose side and an ear side, are formed with a vertical line passing through the design reference point as a reference on the refractive surface on the object side or the refractive surface on the eye side.

The spectacle lens according to this embodiment is designed to be most suitable optically when the spectacle lens is mounted in a spectacle frame that has a camber angle of 200° or more and in which the spectacle lens inclines with respect to a line of sight. In other words, astigmatic aberration and prismatic effect are caused in the spectacle lens that is oblique in the horizontal direction with respect to the line of sight. Therefore, cylindrical power and prismatic power are added to the refractive surface on the object side or the refractive surface on the eye side to cancel out the astigmatic aberration and the prismatic effect at an arbitrary design reference point. Since the astigmatic aberration cannot be corrected in parts other than the design reference point simply by adding the cylindrical power and the prismatic power, the aspherical surfaces different from each other on the nose side and the ear side are formed, whereby it is possible to correct the astigmatic aberration of the entire spectacle lens satisfactorily and obtain a spectacle lens having satisfactory optical performance.

To put it another way, in the first embodiment, there is taught a spectacle lens, intended for use in a spectacle frame with a camber angle of 200° or more. The lens includes cylindrical power, offsetting an aberration due to a camber angle, provided at a design reference point of a refractive surface of the spectacle lens, the refractive surface being at least one of an object side and an eye side of the spectacle lens. The lens also includes prismatic power, offsetting a camber angle prismatic effect, provided at the design reference point. Finally, there is a nose side aspherical surface provided on a nose side of the spectacle lens and an ear side aspherical surface being on an ear side of the spectacle lens, and the nose side and the ear side aspherical surfaces have respectively different manners of curvature change.

In a second embodiment, the invention provides a spectacle lens in which the spectacle frame has an angle of inclination, and the cylindrical power, for offsetting the astigmatic aberration caused by the angle of inclination, at the design reference point to the refractive surface on the object side or the refractive surface on the eye side, and prismatic power for offsetting prismatic effect, which is caused by the angle of inclination, at the design reference point is added to the refractive surface on the object side or the refractive surface on the eye side.

When a spectacle lens is mounted in a spectacle frame having a pantoscopic angle in addition to a camber angle, astigmatic aberration and prismatic effect are caused in the spectacle lens by the pantoscopic angle. Therefore, the cylindrical power and the prismatic power are added to the refractive surface on the object side or the refractive surface on the eye side to cancel out the astigmatic aberration and the prismatic effect at an arbitrary design reference point, whereby it is possible to obtain a spectacle lens having satisfactory optical performance.

To put it another way, in the second embodiment, there is taught a spectacle lens like the first embodiment, but the lens intended for use in a spectacle frame includes a pantoscopic angle, and so the spectacle lens also is provided with cylindrical power, offsetting a pantoscopic angle aberration, provided at the design reference point, and also prismatic power, offsetting a pantoscopic angle prismatic effect, provided at the design reference point.

A third embodiment according to the invention provides a spectacle lens, characterized in that, in the spectacle lens described in the first or the second embodiments, aspherical surfaces different from each other on an upper side and a lower side with a horizontal line passing through the design reference point as a reference are formed on the refractive surface on the object side or the refractive surface on the eye side.

When a spectacle lens is mounted in a spectacle frame having a pantoscopic angle in addition to a camber angle, cylindrical power and prismatic power are added to the refractive surface on the object side or the refractive surface on the eye side to cancel out astigmatic aberration and prismatic effect caused by the pantoscopic angle at the design reference point, whereby it is possible to correct the astigmatic aberration, which is caused by the pantoscopic angle, at the design reference point. Since the astigmatic aberration cannot be corrected in parts other than the design reference point simply by adding the cylindrical power and the prismatic power, the aspherical surfaces different from each other on the upper side and the lower side are formed, whereby it is possible to correct the astigmatic aberration of the entire spectacle lens satisfactorily and obtain a spectacle lens having satisfactory optical performance. The invention is not necessarily limited to the case in which a spectacle lens is mounted in a spectacle frame having a pantoscopic angle in addition to a camber angle.

In other words, in the third embodiment, there is taught a spectacle lens as in the first or second embodiments, but the lens also has an upper aspherical surface on an upper side of the spectacle lens that has a manner of curvature change different from that of a lower aspherical surface on a lower side of the spectacle lens.

According to a fourth embodiment of the invention a spectacle lens is taught as in any of the first to the third embodiments, but the power of the refractive surface on the object side is five diopters or more.

In order to mount the spectacle lens in a spectacle frame of the wraparound type, it is preferable to increase a curvature of the spectacle lens.

It will be appreciated that the invention also resides in a method of spectacle lens design, in which a frame camber angle and a design reference point on a refractive surface of the spectacle lens are determined. A cylindrical power offsetting the camber angle aberration and/or prismatic power offsetting the camber angle prismatic effect is added to one or the other of the refractive surfaces, or either, or both. The amount of power is based on the frame camber angle. In the method, respective aspherical surfaces having respectively different manners of curvature change are provided on a nose side and on an ear side of the spectacle lens. The nose side aspherical surface and the ear side aspherical surface may be provided on different sides of a vertical line passing through the design reference point. In addition, the frame may provide for a pantoscopic angle for the spectacle lens and, to that end, the method may include adding to the refractive surface a cylindrical power offsetting the pantoscopic angle aberration and/or a prismatic power offsetting the pantoscopic angle prismatic effect, based on the pantoscopic angle. On an upper side and on a lower side of the spectacle lens, respectively different manners of curvature change in the aspherical surfaces may also be provided. The upper side and the lower side may be on different sides of a horizontal line passing through the design reference point.

It will also be understood that the invention resides, as well, in spectacles having one or more spectacle lenses as mentioned above and taught below by way of various specific exemplary embodiments explained in detail, and illustrated in the enclosed drawing figures.

BRIEF DESCRIPTION OF THE DRAWINGS

The drawing figures depict, in highly simplified schematic form, embodiments reflecting the principles of the invention. Many items and details that will be readily understood by one familiar with this field have been omitted so as to avoid obscuring the invention. In the drawings:

FIG. 3(a) shows an optical ray path of a spectacle lens in a direction not inclined with respect to a line of sight of a spherical design lens inclined with respect to the line of sight;

FIG. 3(b) shows an optical ray path of a spectacle lens in a direction inclined with respect to the line of sight of the spherical design lens inclined with respect to the line of sight.

FIG. 5(a) shows the astigmatic aberration and

FIG. 5(b) shows the mean dioptric power in the case in which astigmatic aberration and prismatic effect, which are caused by a camber angle, are corrected at a design reference point;

FIG. 5(c) shows the astigmatic aberration and

FIG. 5(d) shows the mean dioptric power in the case in which an aspherical surface according to an aspheric expression is added;

DETAILED DESCRIPTION

The invention will now be taught using various exemplary embodiments. Although the embodiments are described in detail, it will be appreciated that the invention is not limited to just these embodiments, but has a scope that is significantly broader. The appended claims should be consulted to determine the true scope of the invention.

Figure 1A:
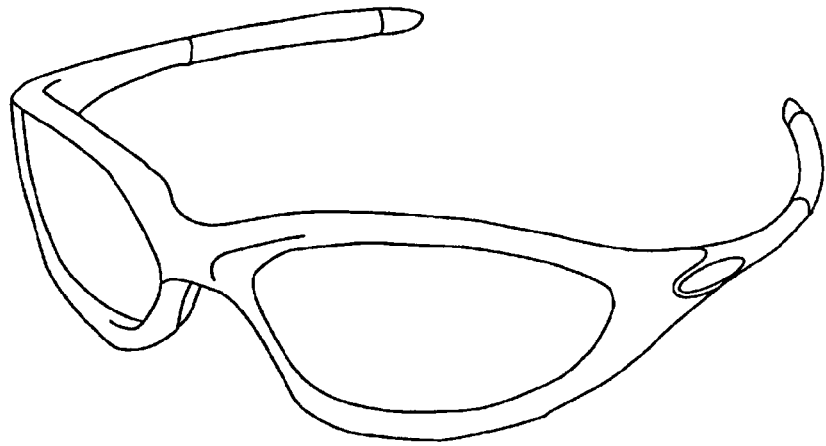
FIG. 1(a) is an oblique perspective view of a spectacle frame of the wraparound type having a lens according to an embodiment of the invention.
Figure 1B:
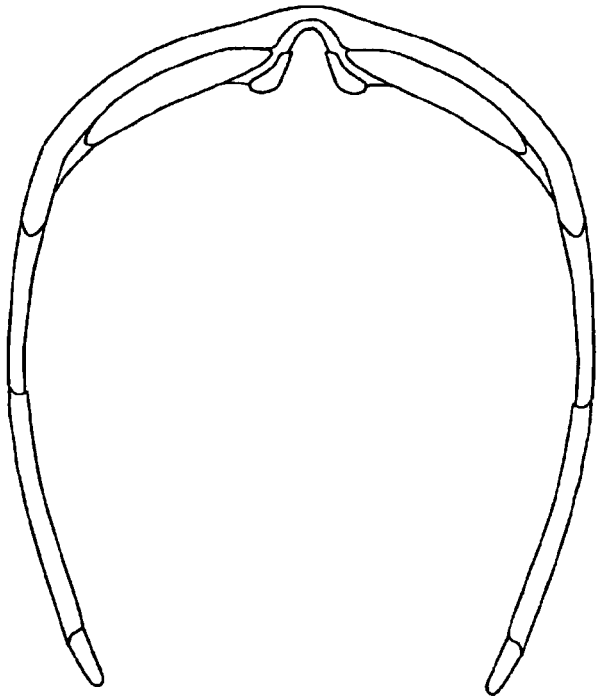
FIG. 1(b) is shows an overhead perspective view of the spectacle frame.
Figure 2A:
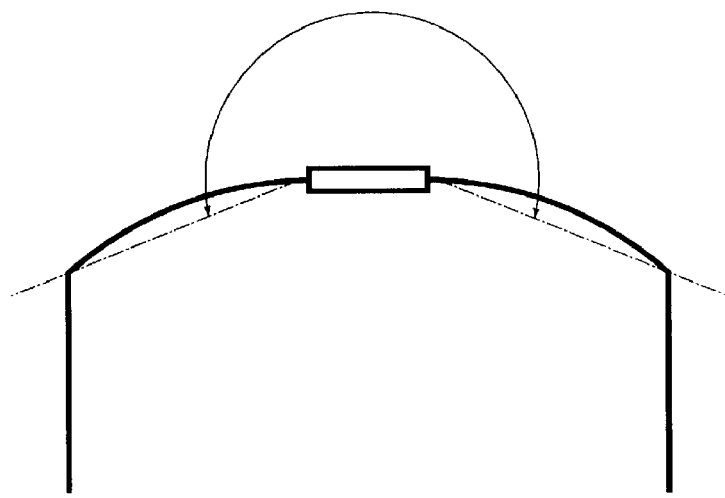
FIG. 2(a) is conceptual diagram showing a camber angle.

The spectacle lens of the invention is designed to show optimum optical performance when the spectacle lens is mounted in a spectacle frame of a wraparound type (see FIGS. 1(a) and 1(b)) having a large camber angle. The camber angle of the spectacle frame is, as shown in FIG. 2(a), an angle formed by left and right rim angles. A case in which the camber angle is less than 180° is called a state of inward camber and a case in which the camber angle is larger than 180° is called a state of outward camber. The spectacle lens of the invention has optical performance consistent with the state of outward camber with the camber angle of 200° or more. A camber angle of a commercially available spectacle frame of the wraparound type is generally in a range of 200 to 250°. As a spectacle frame with a camber angle of 200° or more, other than the spectacle frame of the wraparound type shown in FIG. 1, there are swimming goggles, safety glasses, and the like.

Since the spectacle frame with the camber angle of 200° or more is bent to follow the shape of a face, a spectacle lens is fixed in a state in which the spectacle lens is inclined with respect to a line of sight. The spectacle lens mounted in the spectacle frame with the camber angle of 200° or more is required to have a curvature larger than that of a usual spectacle lens. When represented by surface power, a curvature of a refractive surface on an object side is usually five diopters or more and is generally in a range of six to twelve diopters.

In the usual spectacle lens, assuming that the spectacle lens is mounted in a spectacle frame with a camber angle of 180°, that is, a spectacle frame without camber, a refractive surface on an object side and a refractive surface on an eye side are designed. In the case of optometry, a spectacle frame for optometry without camber is used. When the spectacle lens, which has optical performance based on the assumption that the optical lens is mounted in the optical frame without camber, is fixed in a state in which the optical lens is inclined with respect to the line of sight in this way, the optical performance suffers.

When the usual spectacle lens is used in a state in which there is no camber angle, the spectacle lens achieves a predetermined optical performance. However, when the spectacle lens is mounted in a spectacle frame having a large camber angle and is inclined with respect to a line of sight, while keeping power substantially in the vertical direction as shown in FIG. 3(a), the power in the horizontal direction is changed as shown in FIG. 3(b). As a result, an astigmatic aberration occurs, giving an astigmatic effect to a spherical lens. This astigmatic aberration may be referred to, without loss of generality, as an aberration due to a camber angle.

In addition, when the spectacle lens is inclined with respect to the line of sight, as shown in FIG. 3(b), prismatic effect is generated. This generated prismatic effect may generally be referred to as camber angle prismatic effect.

Figure 2B:
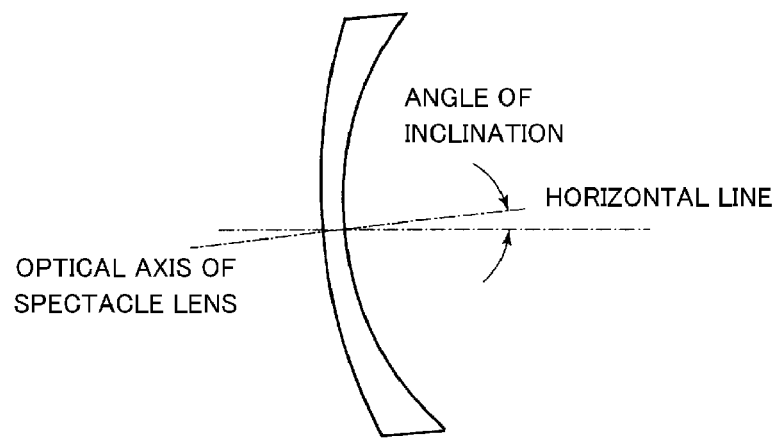
FIG. 2(b) is a conceptual diagram showing a pantoscopic angle.

As shown in FIG. 2(b), when an optical axis of a spectacle lens is inclined from the horizontal direction and the spectacle lens is mounted in a spectacle frame with a pantoscopic angle such that a lower part of the spectacle lens is close to a face, both astigmatic aberration and prismatic effect are generated by this pantoscopic angle in the same manner as the case of the camber angle. Such generated astigmatic aberration and prismatic effect caused by a pantoscopic angle may be referred to, respectively, as pantoscopic angle aberration and pantoscopic angle prismatic effect.

Therefore, when a spectacle lens, which is made assuming that a camber angle is 180°, is mounted in the spectacle frame with a camber angle of 200° or more, astigmatic aberration and prismatic effect, which cause at least astigmatic effect due to the camber angle, are present. Thus, images seen through the spectacle lens are inconveniently blurred.

In the spectacle lens according to an embodiment of the invention, in order to correct such astigmatic aberration and obtain a spectacle lens excellent in optical performance, as a design method, in a first step, an arbitrary design reference point is set on a refractive surface and, in a second step, prismatic power is added to one of a refractive surface on an object side and a refractive surface on an eye side to offset prismatic effect, which is caused by a camber angle, at the design reference point. In a third step, cylindrical power is added to one of the refractive surface on the object side and the refractive surface on the eye side to offset astigmatic aberration, which is caused by the camber angle, at the design reference point. In a fourth step, since astigmatic aberration of the entire spectacle lens cannot be corrected other than the design reference point simply by correcting astigmatic aberration and prismatic effect at the design reference point, aspherical surfaces at least different from each other on the left and right of a vertical line, which passes through the design reference point, with the design reference point as a boundary, are given to the refractive surface, whereby the astigmatic aberration of the entire spectacle lens is corrected satisfactorily. It is possible to reverse the second step and the third step or perform only one of the steps.

When a spectacle frame gives a pantoscopic angle to a spectacle lens, in addition to the correction of astigmatic aberration caused by a camber angle, cylindrical power is added to a refractive surface to offset astigmatic aberration, which is caused by the pantoscopic angle, at a design reference point and prismatic power is added to the refractive surface offset prismatic effect, which is caused by the pantoscopic angle, at the design reference point. In addition, aspherical surfaces at least different from each other above and below a horizontal line, which passes through the design reference point, with the design reference point as a boundary, are given to the refractive surface. Consequently, it is possible to correct astigmatic aberration of the entire spectacle lens satisfactorily.

Note that, since a pantoscopic angle is generally small, it is possible to omit the correction of astigmatic aberration at the design reference point and correct the astigmatic aberration of the entire spectacle lens satisfactorily simply by giving the aspherical surfaces at least different from each other above and below the horizontal line, which passes through the design reference point, with the design reference point as a boundary.

As the design reference point, an arbitrary position can be set. However, usually, an eye point, which is a point where a line of sight passes on a lens when a wearer of spectacles is looking at a distance, is selected as the design reference point. The astigmatic aberration and the prismatic effect fluctuate according to a camber angle and a pantoscopic angle at which the spectacle lens is fixed by the spectacle frame and dioptric power of the spectacle lens. Therefore, it is necessary to correct astigmatic aberration due to the camber angle, the angle of aberration, and the dioptric power at the design reference point.

The refractive surface to which cylindrical power is added to offset astigmatic aberration caused by the camber angle and the pantoscopic angle may be the refractive surface on the object side or the refractive surface on the eye side. An axis of a principal meridian of a surface having highest absolute power of a toroidal surface to be added in that case is in a direction in which an axis is set at the time when the spectacle lens is inclined. The axis is a vertical line passing through the design reference point in the case of the camber angle, and a horizontal line passing through the design reference point in the case of the pantoscopic angle.

The refractive surface to which prismatic power is added to offset prismatic effect caused by the camber angle and the pantoscopic angle may be the refractive surface on the object side or the refractive surface on the eye side. To add the prismatic power, the refractive surface is inclined around the design reference point such that the nose side is in a base position in the case of the camber angle and the upper side is in the base position in the case of the pantoscopic angle.

Cylindrical power may be added to the refractive surface on the object side and prismatic power may be added to the refractive surface on the eye side, or vice versa. Moreover, both cylindrical power and prismatic power may be added to the refractive surface on the eye side to obtain a refractive surface on which the cylindrical power and the prismatic power are synthesized.

Even if astigmatic aberration and prismatic effect caused by the camber angle and the pantoscopic angle at the design reference point are corrected, in the spectacle lens inclined in the horizontal direction and the vertical direction with respect to the line of sight, since an angle of inclination with respect to the line of sight is asymmetrical in the horizontal direction and the vertical direction of the design reference point, the astigmatic aberration and the prismatic effect cannot be corrected completely in the entire spectacle lens.

Therefore, when the spectacle frame has only the camber angle, aspherical surfaces at least different from each other on the nose side and the ear side with a vertical line, which passes through the design reference point, as a boundary are given to the refractive surface on the object side or the refractive surface on the eye side to perform the correction. When the spectacle frame also has the pantoscopic angle, it is preferable to give aspherical surfaces different from each other on the upper side and the lower side with a horizontal line, which passes the design reference point, as a boundary in addition to the asymmetry on the nose side and the ear side to the refractive surface on the object side or the refractive surface on the eye side. The aspherical surfaces different from each other are aspherical surfaces with different ways of change in a curvature, also referred to as differing manners of curvature change. The respective aspherical surfaces given on the nose side and the ear side or the upper side and the lower side are curved surfaces represented by at least one aspherical expression.

The following expression is an example of the aspherical expression.

$$z = \frac{cr^2}{1+\sqrt{1-(1+k)c^2r^2}} + \sum_{i=1} A_i r^i \quad (1)$$

Here, z is a coordinate value of the curved surface, r is a distance from an optical axis in a direction orthogonal to the optical axis, c is a curvature at a lens vertex, and k and $A_i$ are aspherical coefficients, respectively. When the respective aspherical surfaces given on the nose side and the ear side or the upper side and the lower side are represented by one aspherical surface expression, respectively, the aspherical surfaces with different ways of change in a curvature are aspherical surfaces represented by an identical aspherical expression having different aspherical coefficients or aspherical surfaces selected out of aspherical surfaces represented by different definitional expressions. In addition, when the respective aspherical surfaces given on the nose side and the ear side or the upper side or the lower side are represented by two or more aspherical expressions, the aspherical surfaces with different ways of change in a curvature may be aspherical surfaces, in which aspherical expressions representing the aspherical surfaces are represented by an identical definitional expression and which have different aspherical coefficients, or aspherical surfaces, which have parts that are aspherical surfaces represented by different definitional expressions, in positions axially symmetrical with respect to the vertical line or the horizontal line passing through the design reference point.

Figure 2C:
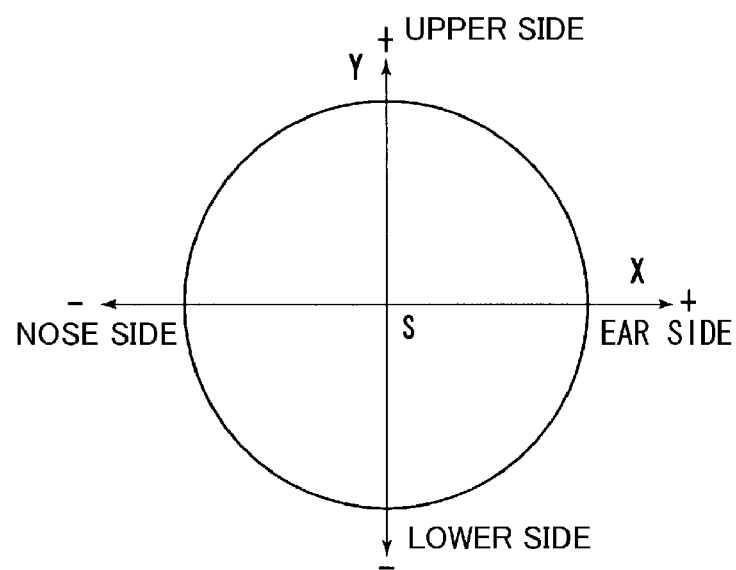
FIG. 2(c) is a conceptual diagram showing a coordinate system in a spectacle lens.

FIG. 2(c) shows sections, to which aspherical surfaces are given, in a spectacle lens for a right eye. For convenience of explanation, a design reference point S of an eye point is set in the center of the spectacle lens. When only a camber angle is taken into account, aspherical surfaces are given asymmetrically with asymmetrical expressions different from each other in areas divided into two on a nose side and an ear side with a vertical line (a Y axis), which passes through this design reference point S, as a boundary. Aspherical surfaces are given asymmetrically using a same aspherical expression in the vertical direction. In addition, when a pantoscopic angle is also taken into account, in addition to the areas divided into two, there are areas divided into two on an upper side and a lower side with a horizontal line (an X axis), which passes through the design reference point S, as a boundary, and aspherical surfaces are given with aspherical expressions different from one another in the areas divided into four. It is needless to mention that the four asymmetrical sections consisting of the horizontal asymmetrical sections and the vertical asymmetrical sections may be further divided into sections to give aspherical surfaces represented by aspherical expressions different from one another. Furthermore, it will be understood that the upper and lower sides and the ear and nose sides of the spectacle lens together may be thought of as defining four quadrants of the spectacle lens (although the quadrants need not be equal nor in the shape shown in FIG. 2(c).

FIRST EMBODIMENT

Figure 4A:
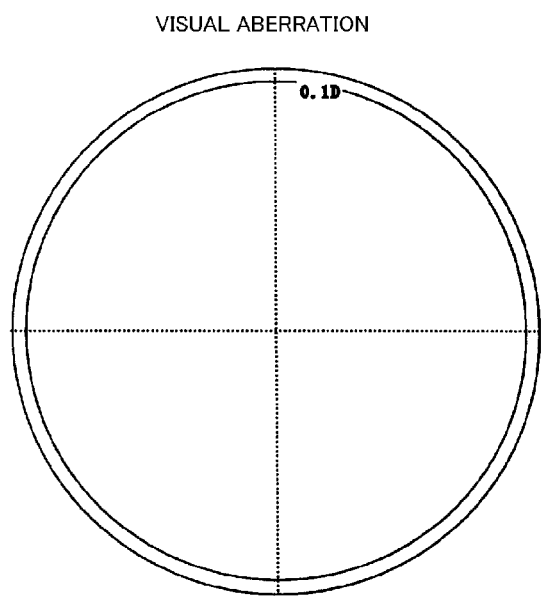
FIG. 4(a) shows the astigmatic aberration of a conventional spectacle lens.
Figure 4B:
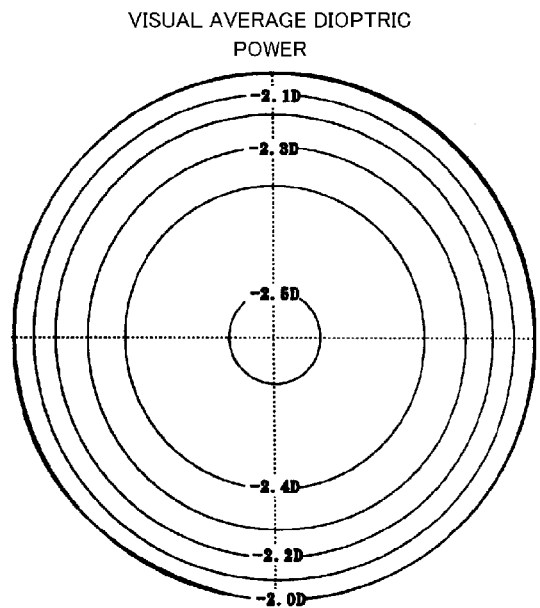
FIG. 4(b) shows the mean dioptric power of the conventional spectacle lens.
Figure 4B:
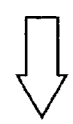
Figure 4B:
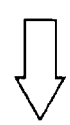

A single-vision lens of a spherical design, in which power of a refractive surface on an object side (a front surface) was 8 D (diopters), power of a refractive surface on an eye side (a back surface) was 10.54 D, a central thickness was 1.05 mm, dioptric power was −2.5 D, was used as a basic lens. It is assumed that this single-vision lens is mounted in a spectacle frame without a camber angle. FIG. 4(a) shows the astigmatic aberration at the time when this single-vision lens is mounted in the spectacle frame without a camber angle and FIG. 4(b) shows mean dioptric power. All figures to be described below shows the spectacle lens for the right eye. A horizontal line indicated by a broken line is the same as the X axis shown in FIG. 2(c) and a vertical line indicated by a broken line is the same as the Y axis shown in FIG. 2(c). An intersection in the centers of the horizontal line and the vertical line is a design reference point serving as an eye point. A left side of the eye point is a nose side and a right side of the eye point is an ear side.

Figure 4C:
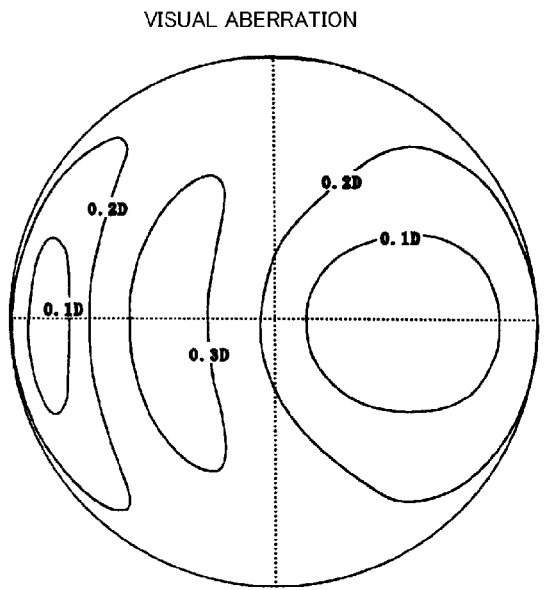
FIG. 4(c) shows the astigmatic aberration when a camber angle is given to the conventional spectacle lens.
Figure 4D:
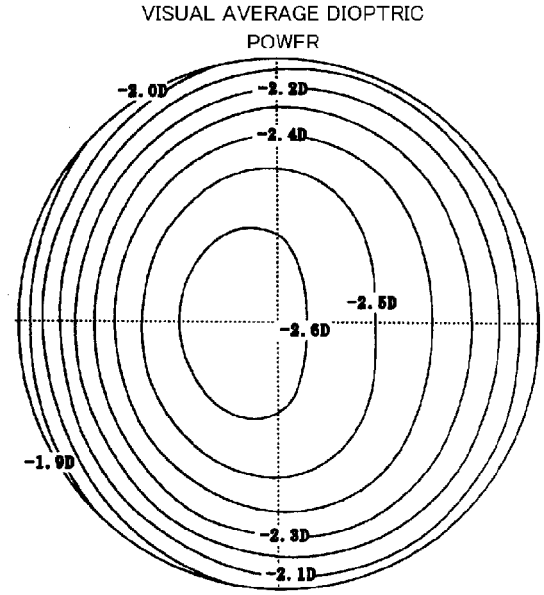
FIG. 4(d) shows the mean dioptric power when a camber angle is given to the conventional spectacle lens.

From FIG. 4(a), it is found that, when the single-vision lens is mounted in the spectacle frame without a camber angle, there is almost no astigmatic aberration and the single-vision lens has satisfactory optical performance. FIG. 4(c) shows the astigmatic aberration at the time when this lens is inclined around the eye point on the refractive surface on the object side and mounted in a spectacle frame of a wraparound type in which a camber angle is 210° and an pantoscopic angle is zero. FIG. 4(d) shows mean dioptric power of the lens. In the following explanation, the eye point on the refractive surface on the object side, around which the lens is inclined, is assumed to be an eye point and a design reference point at the time when the lens is mounted in the frame of the wraparound type.

When the astigmatic aberration in FIG. 4(a) and the astigmatic aberration in FIG. 4(c) are compared, it is found that astigmatic aberration is caused by the camber angle, large astigmatic aberration occurs in a part closer to the nose side from the center, and astigmatic aberration also occurs at the eye point. In addition, when the mean dioptric power in FIG. 4(b) and the mean dioptric power in FIG. 4(d) are compared, it is found that dioptric power is excessive to correct visual power by the camber angle in a part from the center to the nose side and decreases rapidly with going toward the left or right ends.

The eye point in the center of the lens was set as a design reference point, the refractive surface on the eye side was set as a toroidal surface with 10.31 D in an X direction and 10.48 D in a Y direction, and prism correction for inclining the refractive surface on the eye side by 2.83° (a prism: 0.328 prism diopters) in a horizontal direction around the eye point was performed such that the nose side was in a base position. FIG. 5(a) shows the astigmatic aberration of the spectacle lens subjected to these corrections and FIG. 5(b) shows mean dioptric power.

When the astigmatic aberration in FIG. 4(c) and the astigmatic aberration in FIG. 5(a) are compared, it is found that, although astigmatic aberration around the eye point is almost eliminated by these corrections, astigmatic aberration remains asymmetrically in the horizontal direction. In addition, when the mean dioptric power in FIG. 4(d) and the mean dioptric power in FIG. 5(b) are compared, it is found that, although dioptric power from the center to the nose side is corrected, dioptric power decreases rapidly asymmetrically on the left and right going toward the periphery.

After correcting the astigmatic aberration at the eye point, an aspherical surface was added to the refractive surface on the eye side of the nose side using an aspherical expression having an aspherical coefficient for correcting astigmatic aberration in a negative direction (the nose side) of the X direction with a Y axis, which passed through the eye point, as a boundary. An aspherical surface was added to the reflection surface on the eye side of the ear side using an aspherical expression having an aspherical coefficient for correcting astigmatic aberration in a positive direction (the ear side) of the X direction. Further, in the Y direction, an aspherical surface was added to the refractive surface on the eye side symmetrically to the X axis using an aspherical expression having a same aspherical coefficient on an upper side and a lower side with the X axis as a boundary.

Figure 6A:
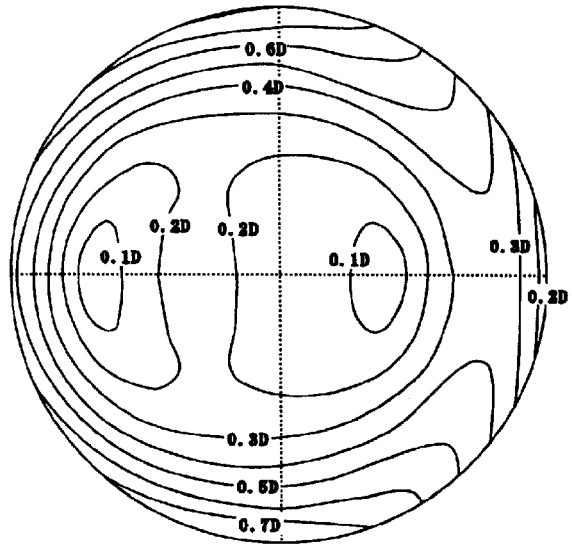
FIG. 6(a) shows the surface astigmatic aberration.
Figure 6B:
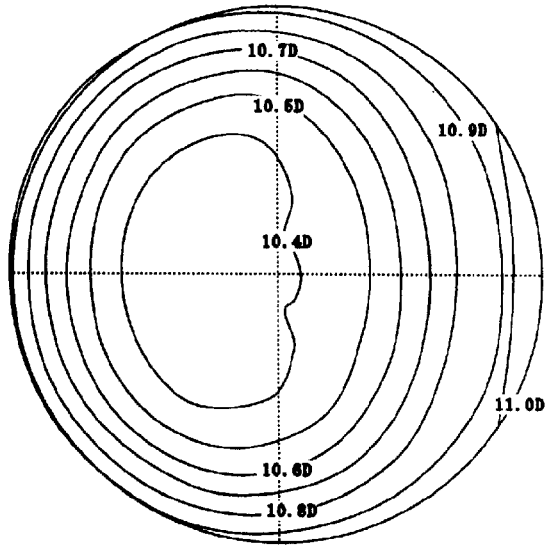
FIG. 6(b) shows the surface mean dioptric power of a refractive surface on an eye side, according to the first embodiment of the invention.

As a result, a spectacle lens, in which the refractive surface on the object side was a spherical surface and the refractive surface on the eye side was a toroidal surface and a surface had prismatic effect for canceling out astigmatic aberration and prismatic effect due to a camber angle and which had an aspherical surface synthesized with an aspherical surface represented by an aspherical expression in addition to the spherical surface and the toroidal surface and the surface had prismatic effect, could be designed. FIG. 5(c) shows the astigmatic aberration of this spectacle lens and FIG. 5(d) shows mean dioptric power of the spectacle lens. FIG. 6(a) shows the surface astigmatic aberration of the refractive surface on the eye side and FIG. 6(b) shows the surface mean doptric power of the back surface.

When FIG. 4(c) showing the astigmatic aberration of the conventional spectacle lens and FIG. 5(c) showing the astigmatic aberration of the invention are compared, the astigmatic aberration looks worsening in a peripheral part in the spectacle lens of the invention. However, since an area set in an actual frame is near the center, the astigmatic aberration is corrected satisfactorily in the frame. In addition, when FIG. 4(d) showing the mean dioptric power of the conventional spectacle lens and FIG. 5(d) showing the mean dioptric power of the invention are compared, the dioptric power is made substantially uniform over the entire spectacle lens.

SECOND EMBODIMENT

As in the first embodiment, the following basic lens was used: a single-vision lens of a spherical design, in which the power of a refractive surface on an object side (a front surface) was 8 D (diopters), the power of a refractive surface on an eye side (a back surface) was 10.54 D, a central thickness was 1.05 mm, and the dioptric power was −2.5 D.

Correction of astigmatic aberration was applied to the refractive surface on the eye side assuming a case in which this lens was inclined around the eye point on the refractive surface on the object side and mounted in a spectacle frame of a wraparound type in which a camber angle was 210° and a pantoscopic angle was 8.66°. Here, the eye point on the refractive surface on the object side, around which the lens is inclined, is assumed to be an eye point and a design reference point at the time when the lens is mounted in the frame of the wraparound type astigmatic Aberration caused by a camber angle, prismatic effect caused by the camber angle, astigmatic aberration caused by a pantoscopic angle, prismatic effect caused by the pantoscopic angle at the eye point were corrected to be canceled out. Moreover, an aspheric surface was added to the refractive surface on the eye side using an aspheric expression having aspheric coefficients different from each other on a nose side and an ear side in an X direction with a Y axis, which passed through the design reference point, as a boundary and an aspheric expression having aspheric coefficients different from each other on an upper side (a positive side) and a lower side (a negative side) in a Y direction with an X axis, which passed through the design reference point, as a boundary. In other words, aspheric surfaces were added to areas on the upper side of the ear side, the lower side of the ear side, the upper side of the nose side, and the lower side of the nose side, which were divided into four by the X axis and the Y axis, using aspheric expressions having aspheric coefficients different from one another.

As a result, a spectacle lens, in which the refractive surface on the object side was a spherical surface, the refractive surface on the eye side was a toroidal surface and the surface which had prismatic effect for canceling out astigmatic aberration and prismatic effect due to a camber angle and a toroidal surface and the surface which had prismatic effect for canceling out astigmatic aberration and prismatic effect due to a pantoscopic angle and which had an aspherical surface synthesized with an aspherical curved surface represented by an aspherical expression in addition to the spherical surface and the toroidal surfaces and the surface which has prismatic effect, could be designed.

Figure 6C:
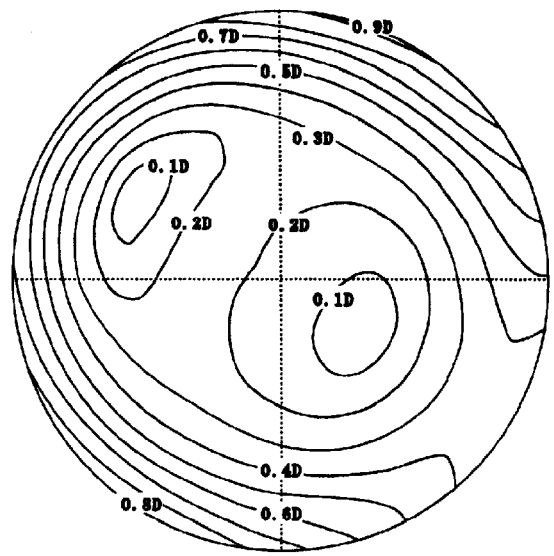
FIG. 6(c) shows the surface astigmatic aberration.
Figure 6D:
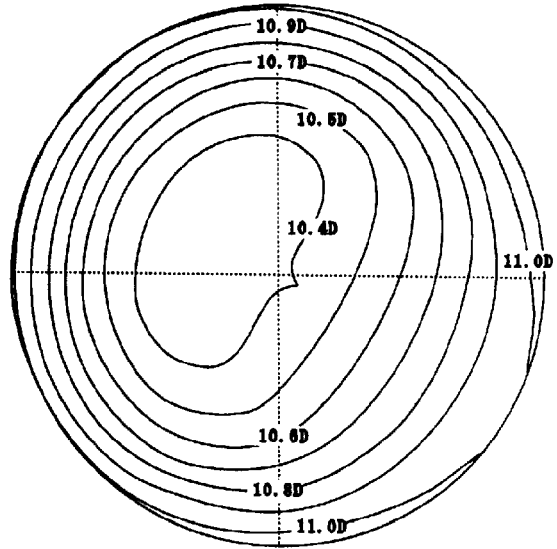
FIG. 6(d) shows the surface mean dioptric power of a refractive surface on an eye side, according to the second embodiment of the invention.
Figure 7A:
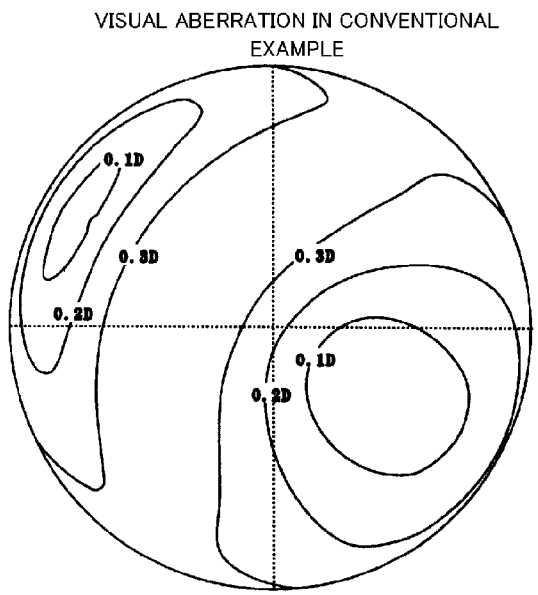
FIG. 7(a) shows the astigmatic aberration.
Figure 7B:
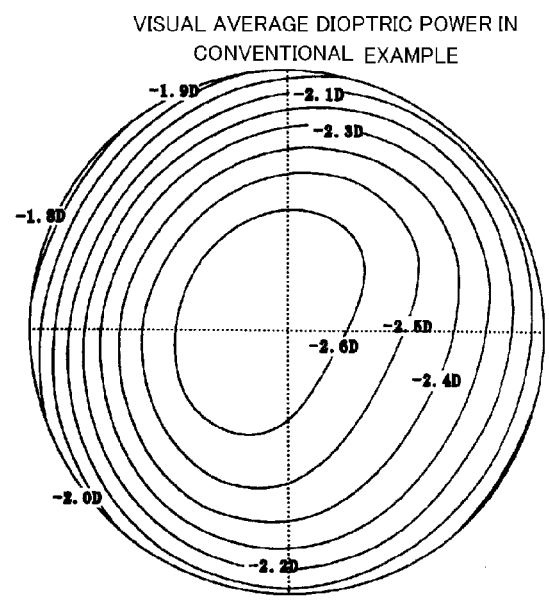
FIG. 7(b) shows the mean dioptric power in the case in which a camber angle and a pantoscopic angle are given to the conventional spectacle lens.
Figure 7C:
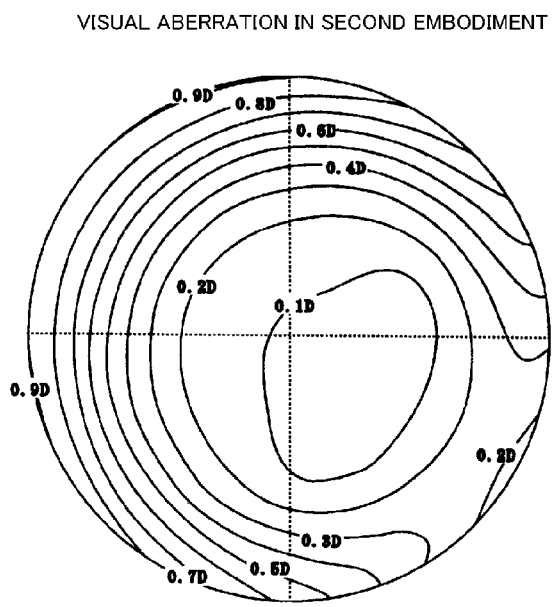
FIG. 7(c) shows the astigmatic aberration and FIG. 7(d) shows the mean dioptric power of a spectacle lens according to the second embodiment.
Figure 7D:
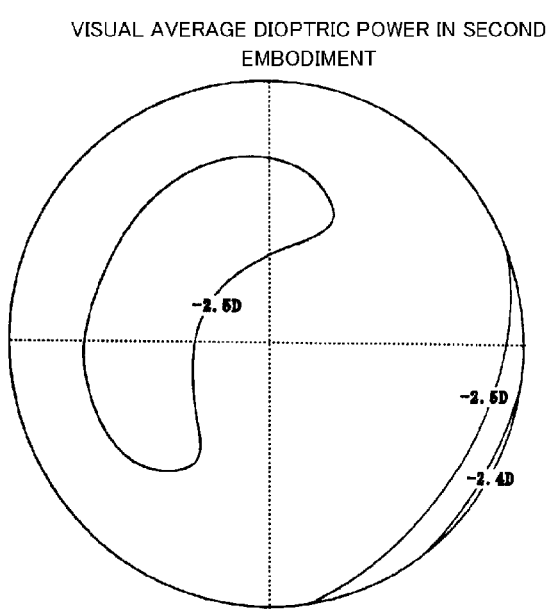

FIG. 6(c) shows the surface astigmatic aberration of the refractive surface on the eye side of the spectacle lens corrected in this way is mounted in the spectacle frame of the wraparound type with a camber angle of 210° and a pantoscopic angle of 8.66° and FIG. 6(d) shows the surface mean doptric power of the refractive surface. FIG. 7(a) shows the astigmatic aberration in the case in which the single-vision lens of the basic spherical design is mounted in the spectacle frame of the wraparound type with a camber angle of 210° and an pantoscopic angle of 8.66°. FIG. 7(b) shows mean dioptric power in that case. FIG. 7(c) shows the astigmatic aberration of the spectacle lens of the second embodiment in which the correction is applied to the refractive surface on the eye side. FIG. 7(d) shows mean dioptric power of the spectacle lens.

When FIG. 7(a) showing the astigmatic aberration of the conventional spectacle lens and FIG. 7(c) showing the astigmatic aberration of the spectacle lens of the invention are compared, in the spectacle lens of the conventional spherical design, astigmatic aberration and prismatic effect are caused by a camber angle and an pantoscopic angle and large astigmatic aberration occurs from the vicinity of the center to the nose side. On the other hand, in the spectacle lens of the invention, although astigmatic aberration is large in the peripheral part, astigmatic aberration is small near the center and is sufficiently small in the frame.

When FIG. 7(b) showing the mean dioptric power of the conventional example and FIG. 7(d) showing the mean dioptric power of the invention are compared, the spectacle lens of the spherical design is excessive to correct visual power near the center and dioptric power decreases significantly going toward the peripheral part. On the other hand, in the spectacle lens of this embodiment of the invention, dioptric power of the entire lens is within a range of target dioptric power.

In the above explanation, only the single-vision spectacle lens is explained. However, the spectacle lens of the invention can be applied to all of: a bifocal lens, a progressive-power lens, and a toric lens. The foregoing teachings can be further applied to a spectacle lens having power that is obtained by combining these lenses.

It is possible to use the spectacle lens of the foregoing embodiments of the invention in an application in which the spectacle lens is mounted in a spectacle frame of a wrap-around type and satisfactorily corrects eyesight of a wearer.

Many variations to the above-identified embodiments are possible without departing from the scope and spirit of the invention. Possible variations have been presented throughout the foregoing discussion. Combinations and subcombinations of the various embodiments described above will occur to those familiar with this field, without departing from the scope and spirit of the invention.

What is claimed is:

1. A spectacle lens, intended for use in a spectacle frame with a camber angle of 200° or more, comprising:
   cylindrical power, offsetting an aberration due to a camber angle, provided at a design reference point of a refractive surface of the spectacle lens, the refractive surface being at least one of an object side and an eye side of the spectacle lens;
   prismatic power, offsetting prismatic effect due to a camber angle, provided at the design reference point; and
   a nose side aspherical surface provided on a nose side of the spectacle lens and an ear side aspherical surface being on an ear side of the spectacle lens, the nose side and the ear side aspherical surfaces having respectively different manners of curvature change.

2. The spectacle lens according to claim 1, wherein the intended spectacle frame includes a pantoscopic angle, the spectacle lens further comprising:
   cylindrical power, offsetting aberration due to a pantoscopic angle, provided at the design reference point; and
   prismatic power, offsetting prismatic effect due to a pantoscopic angle, provided at the design reference point.

3. The spectacle lens according to claim 1 or 2, further comprising an upper aspherical surface on an upper side of the spectacle lens having a manner of curvature change different from that of a lower aspherical surface on a lower side of the spectacle lens.

4. The spectacle lens according to claim 1, wherein the power of the refractive surface on the object side is five diopters or more.

5. A spectacle lens design method, comprising:
   determining a frame camber angle and a design reference point on a refractive surface of the spectacle lens;
   adding to the refractive surface one or more of:
      cylindrical power offsetting an aberration due to a camber angle, based on the frame camber angle, and
      prismatic power offsetting a camber angle prismatic effect, based on the frame camber angle; and
   providing on a nose side and on an ear side of the spectacle lens respective aspherical surfaces having respectively different manners of curvature change.

6. The spectacle lens design method as set forth in claim 5, wherein the nose side aspherical surface and the ear side aspherical surface are provided on different sides of a vertical line passing through the design reference point.

7. The spectacle lens design method as set forth in claim 5, further comprising:
   determining a pantoscopic angle for the spectacle lens; and
   adding to the refractive surface one or more of:
      cylindrical power offsetting a pantoscopic angle aberration, based on the pantoscopic angle of inclination, and
      prismatic power offsetting a pantoscopic angle prismatic effect, based on the pantoscopic angle.

8. The spectacle lens design method as set forth in claim 7, further comprising providing on an upper side and on a lower side of the spectacle lens respectively different manners of curvature change in the aspherical surfaces.

9. The spectacle lens design method as set forth in claim 8, wherein the upper side and the lower side are provided on different sides of a horizontal line passing through the design reference point.

10. The spectacle lens design method as set forth in claim 5, wherein the refractive surface is on an object side of the spectacle lens.

11. The spectacle lens design method as set forth in claim 5, wherein the refractive surface is on an eye side of the spectacle lens.

12. The spectacle lens design method as set forth in claim 11, wherein the refractive surface is also on an object side of the spectacle lens.

13. Spectacles, comprising:
   a frame having a camber angle of 200° or more; and
   a spectacle lens, disposed in the frame, having a respective nose side and a respective ear side, the spectacle lens comprising:
      cylindrical power, offsetting an astigmatic aberration due to the camber angle, provided at a design reference point of a refractive surface of the spectacle lens, the refractive surface being at least one of an object side and an eye side of the spectacle lens;
      prismatic power, offsetting a prismatic effect due to the camber angle, provided at the design reference point; and
      a nose side aspherical surface provided on the nose side of the spectacle lens and an ear side aspherical surface being on the ear side of the spectacle lens, the nose side and the ear side aspherical surfaces having respectively different manners of curvature change.

14. The spectacles as set forth in claim 13, further comprising:
 the spectacle lens being disposed in the frame at a pantoscopic angle;
 the spectacle lens further including:
  cylindrical power, offsetting an astigmatic aberration due to the pantoscopic angle, provided at the design reference point; and
  prismatic power, offsetting a prismatic effect due to the pantoscopic angle, provided at the design reference point.

15. The spectacles as set forth in claim 13 or 14, wherein the spectacle lens has at an upper side a manner of curvature change different from that at a lower side of the spectacle lens.

16. The spectacles as set forth in claim 13 or 14, wherein the nose side aspherical surface and the ear side aspherical surface are provided on different sides of a vertical line passing through the design reference point.

17. The spectacles as set forth in claim 13 or 14, wherein the upper and the lower sides of the spectacle lens are provided on different sides of a horizontal line passing through the design reference point.

18. The spectacles as set forth in claim 13 or 14, wherein the frame is of the wraparound type, and wherein the manner of curvature change of the spectacle lens is different in each of four quadrants of the spectacle lens.

* * * * *